United States Patent [19]

Tillman

[11] Patent Number: 4,685,029
[45] Date of Patent: Aug. 4, 1987

[54] RECONFIGURABLE STANDARD SWITCH PANEL

[75] Inventor: Christopher D. Tillman, Lakewood, Colo.

[73] Assignee: Orbital Research Partners, L.P., Fairfax, Va.

[21] Appl. No.: 840,125

[22] Filed: Mar. 14, 1986

[51] Int. Cl.$^4$ .............................................. H02B 1/08
[52] U.S. Cl. ................................... 361/359; 361/346
[58] Field of Search ............... 361/346, 347, 348, 349, 361/350, 352, 359

[56] References Cited

U.S. PATENT DOCUMENTS 2,287,797  6/1942  Hanley ................................ 361/350

Primary Examiner—Roy N. Envall, Jr.
Attorney, Agent, or Firm—Kirkland & Ellis

[57] ABSTRACT

A switch panel that can be quickly and easily reconfigured is disclosed. The number, type and location of the switches and indicators on the switch panel can be selected to optimize the switch panel for a particular application. The switches and indicators are plugged into a fixed receptacle board in the switch panel. A wiring board customized for the particular application is inserted into the switch panel to complete the reconfiguration.

8 Claims, 3 Drawing Figures

RECONFIGURABLE STANDARD SWITCH PANEL

BACKGROUND OF THE INVENTION

1. Field of the Invention

This invention relates broadly to the field of manual switching devices in general and in particular, relates to a reconfigurable standard switch panel that allows simple and quick optimization of the switch panel for a wide range of applications.

2. Brief Description of the Prior Art

Switch panels are often used to interface between a human operator and a number of electrically activated or monitored devices. Switches on the switch panel can be used, for example, to electrically activate and deactivate devices. Indicators such as lights and gauges on the switch panel can be used to provide information concerning the operation or status of devices that are controlled by the switches on the switch panel or of other devices.

Traditionally, switch panels are built for a particular application. The number, type and location of the switches and indicators on the switch panels are fixed at the time of construction. Applications differing from the one contemplated at the time of construction often use a less than optimum switch panel configuration, or else the switch panel must undergo tedious and time-consuming modification, usually requiring disassembly, unsoldering and reconstruction.

Accordingly, it is an object of the present invention to provide a modular switch panel that allows the number, type and location of the switches and indicators on the switch panel to be optimized for a variety of specific, different applications.

It is also an object of the present invention to provide a switch panel that can be simply and quickly reconfigured to provide an optimum configuration for each new application.

SUMMARY OF THE INVENTION

The present invention is a reconfigurable standard switch panel that allows simple and quick optimization of the switch panel for any of a wide range of applications. The switch panel is modular, allowing the number, type and location of the switches and indicators on the switch panel to be quickly and easily changed by insertion into a fixed receptacle board inside the switch panel. The reconfiguration is completed by the insertion of a replaceable wiring board that provides for proper connection of the switches and indicators on the face of the switch panel to the external device connectors on the rear of the switch panel. The devices to be controlled and/or monitored by the switch panel are connected to the rear of the switch panel by conventional cables and external device connectors.

To optimally configure the present invention, the optimum number and type of switches are inserted into the face of the switch panel in the most logical and efficient location, thereby reducing operator confusion and training time, while increasing efficiency and functionality. Electrical and mechanical connection of the switches and indicators is made by insertion into the sockets on a receptacle board. A wiring board, which is pre-designed to make the proper desired connections between the switches and indicators on the face plate of the switch panel and the external device connectors on the rear of the switch panel, is inserted into the switch panel. Only the wiring board is unique for each different configuration, thereby simplifying changes in the number, type and location of switches and indicators. Fixed connectors and wiring harnesses or bundles establish electrical connection between the receptacle board and the wiring board, and between the wiring board and the external device connectors. Thus, optimization of the switch panel can be quickly and completely reconfigured by inserting the optimum number and type of switches and indicators in the optimum location, and by inserting the proper wiring board for such configuration into the switch panel.

DESCRIPTION OF THE DRAWINGS

The objects and features of this invention will become more apparent from a consideration of the following detailed description and the drawing in which.

DESCRIPTION OF THE PREFERRED EMBODIMENT

Figure 1:
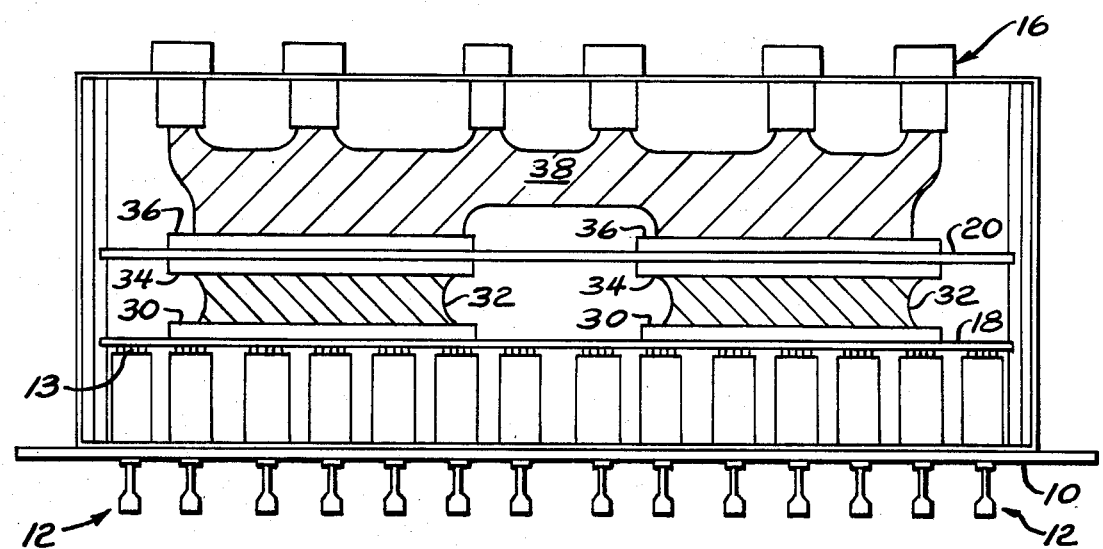
FIG. 1 is a top view of the preferred embodiment of the present invention.
Figure 2:
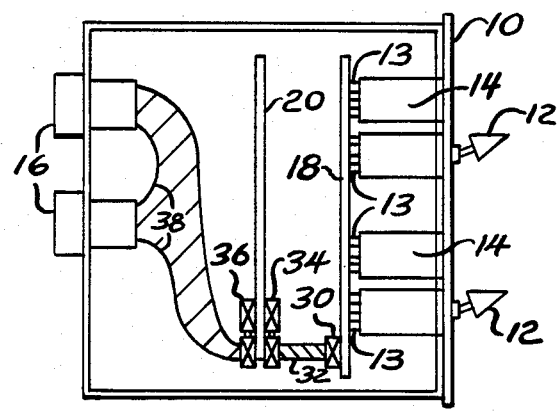
FIG. 2 is a side view of the preferred embodiment of the present invention.

FIGS. 1 and 2 illustrate a variety of switches 12 and indicators 14 on face plate 10. In the preferred embodiment, switches 12 include a variety of types such as single pole, double throw; triple pole, double throw, etc. Indicators of various types suitable for a variety of applications also are used. Receptacle board 1-8 contains sockets 13 into which switches 12 and indicators 14, which are of the plug-in variety, are inserted. Sockets 13 establish electrical and mechanical connection between switches 12 and indicators 14 and receptacle board 18.

Electrical connection between switches 12 and indicators 14 and wiring board 20 is made by connectors 30, wiring harnesses 32 and connectors 34. Connectors 30 and 34 are any suitable type of connector, such as conventional pin or edge connectors, and wiring harnesses 32 are conventional wire bundles or ribbon cables.

Wiring board 20 consists of a series of conductors, such as a stitch wiring board, that make the proper desired connections between switches 12 and indicators 14 and external device connectors 16 by providing the proper electrical connections between the conductors or pins of connectors 34 and the conductors or pins of connectors 36. Electrical connection between wiring board 20 and external device connectors 16 is made by connectors 36 and wiring harness 38.

Figure 3:
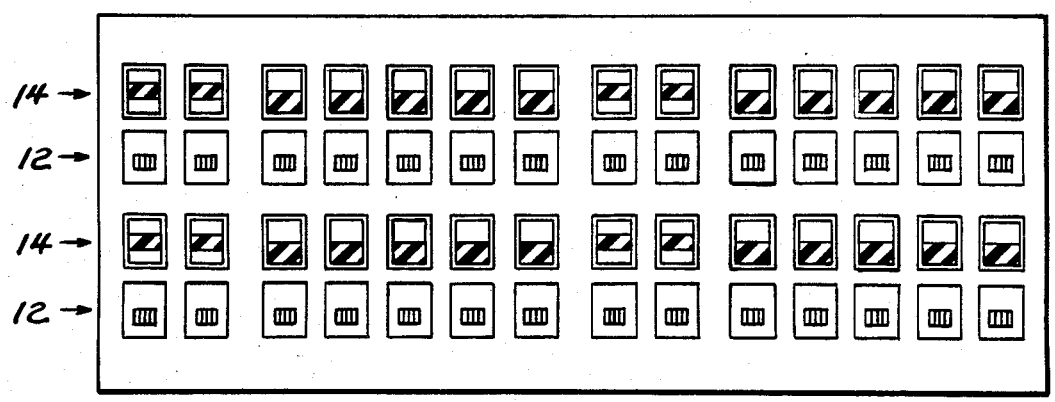
FIG. 3 is a representative face plate of the preferred embodiment of the present invention.

FIG. 3 illustrates face plate 10 of the preferred embodiment of the present invention. Face plate 10 contains two rows of switches 12 and two rows of indicators 14, although fewer or more rows or columns or any other type of orientation could be used. The number and type of switches 12 and indicators 14 and arrangement on faceplate 10 are selected to optimize their functionality and ease of use for a particular application.

Thus, the switch panel of the present invention can be quickly and simply optimized for the particular application. The most logical and efficient selection of switches and indicators, and the optimum location for the switches and indicators is easily obtainable by unplugging them and plugging them back in at the desired location. Once the desired arrangement is arrived at, a wiring board 20 is fabricated to make the desired connections from switches 12 and indicators 14 to external connectors 16. The present invention thereby reduces operator confusion, and hence operator training time, for a wide variety of applications.

While the preferred embodiment of the present invention has been illustrated and described, it is to be understood that the invention is not limited to the precise construction herein disclosed, and the right is reserved to all changes and modifications coming within the scope of the invention as defined in the appended claims.

What is claimed is:

1. A reconfigurable switch panel apparatus having a variety of possible configurations of switches and indicators of various types for interfacing between a human operator and a number of electrically activated or monitored devices, comprising:
   a plurality of switch means;
   a plurality of indicator means;
   receptacle board means having sockets for electrical and mechanical connection to each of said switch means and to each of said indicator means;
   wiring board means having first and second connector means connected by a plurality of electrical conductors;
   first conductor means for connecting the sockets on said receptacle board means to said first connector means of said wiring board means;
   third connector means for providing electrical connection to the devices;
   second conductor means for connecting said second connector means of said wiring board means to said third connector means, thereby providing electrical connections from said switch means and said indicator means to the devices.

2. The apparatus as claimed in claim 1 wherein said receptacle board means further comprises panel connector means electrically connected to the sockets on said receptacle board means and wherein said first conductor means connects between said panel connectors means and said first connector means of said wiring board means.

3. The apparatus as claimed in claim 1 wherein said receptacle board further comprises a plurality of conductive wires for electrically connecting said first and second connector means.

4. A reconfigurable switch panel apparatus for controlling and monitoring a plurality of different electical devices comprising:
   a plurality of switches, at least some of said switches being of different types;
   a plurality of indicators, at least some of said indicators being of different types;
   a plurality of first connector means for providing electrical and mechanical connection to said switches and said indicators and wherein one of said first connector means is mounted on each of said switches and said indicators;
   receptacle board means;
   a plurality of second connector means mounted on said receptacle board means for interconnecting electrically and mechanically with said first connector means;
   a plurality of third connector means;
   a plurality of fourth connector means;
   wiring board means wherein said third and fourth connector means are mounted thereon, said wiring board means providing a first predetermined set of electrical connections between said third and fourth connector means;
   first electrical interconnect means for providing electrical connections between said second and third connector means; and
   second electrical interconnect means for providing electrical connections between said fourth connector means and the electrical devices being controlled and monitored.

5. The apparatus as claimed in claim 4 wherein said wiring board means and said third and fourth connector means are interchangeable with second wiring board means having fifth and sixth connector means mounted thereon so as to provide a second predetermined set fo electrical connections between said third and fourth connector means.

6. The apparatus as claimed in claim 4 wherein said third and fourth connector means are mounted on opposite sides of said wiring board means.

7. The apparatus as claimed in claim 4 wherein each of said switches is interconnectable electrically and mechanically with each of said first connector means.

8. The apparatus as claimed in claim 4 wherein each of said indicators is interconnectable electrically and mechanically with each of said first connector means.

* * * * *

UNITED STATES PATENT AND TRADEMARK OFFICE
CERTIFICATE OF CORRECTION

PATENT NO. : 4,685,029

DATED : August 4, 1987

INVENTOR(S) : Christopher D. Tillman

It is certified that error appears in the above-identified patent and that said Letters Patent is hereby corrected as shown below:

Column 2, line 32, "1-8" should be --18--.

Column 3, line 42, "connectors" should be --connector--.

Column 4, line 36, "fo-" should be --of--.

Signed and Sealed this

Fifth Day of January, 1988

Attest:

DONALD J. QUIGG

Attesting Officer

Commissioner of Patents and Trademarks